United States Patent
De Angeli

(10) Patent No.: US 11,668,686 B1
(45) Date of Patent: Jun. 6, 2023

(54) BATTERYLESS ARCHITECTURE FOR COLOR DETECTION IN SMART LABELS

(71) Applicant: Flex Ltd.

(72) Inventor: Marco De Angeli, Brazana (IT)

(73) Assignee: Flex Ltd., Singapore (SG)

(*) Notice: Subject to any disclaimer, the term of this patent is extended or adjusted under 35 U.S.C. 154(b) by 1024 days.

(21) Appl. No.: 16/443,546

(22) Filed: Jun. 17, 2019

(51) Int. Cl.
G01N 31/22 (2006.01)
H04B 5/00 (2006.01)
G01N 21/81 (2006.01)
G01K 11/16 (2021.01)

(52) U.S. Cl.
CPC ........... *G01N 31/222* (2013.01); *G01K 11/16* (2013.01); *G01N 21/81* (2013.01); *H04B 5/0037* (2013.01)

(58) Field of Classification Search
CPC ...... G01N 31/222; G01N 21/81; G01K 11/16; H04B 5/0037
See application file for complete search history.

(56) References Cited

U.S. PATENT DOCUMENTS

| | | |
|---|---|---|
| 3,830,991 A | 8/1974 | Durocher |
| 4,017,697 A | 4/1977 | Larson |
| 5,626,135 A | 5/1997 | Sanfilippo |
| 6,382,125 B1 * | 5/2002 | Tamura ............... B41M 5/30 374/102 |
| 6,388,556 B1 | 5/2002 | Imai |
| 6,400,573 B1 | 6/2002 | Mowatt |
| 6,483,055 B1 | 11/2002 | Tanobe |
| 6,830,668 B2 | 12/2004 | Musho |
| 7,112,755 B2 | 9/2006 | Kitano |
| 7,528,337 B2 | 5/2009 | Tanobe |
| 7,600,912 B2 * | 10/2009 | Leute ............... G03G 15/0848 374/161 |
| 7,935,893 B2 | 5/2011 | Tanaka |
| 8,552,730 B2 | 10/2013 | Chiao |
| 9,470,699 B2 * | 10/2016 | Peeters ............... A61B 5/4839 |
| 9,549,468 B1 | 1/2017 | Tsai |
| 9,651,514 B2 | 5/2017 | Soccol |
| 9,857,236 B2 * | 1/2018 | Ribi ............... C08F 238/02 |
| 10,444,184 B2 * | 10/2019 | Azpiroz ........... G01N 27/44791 |

(Continued)

OTHER PUBLICATIONS

Notice of Allowance dated Jun. 10, 2019, U.S. Appl. No. 16/035,447, filed Jul. 13, 2018, Applicant: Cesar Ocampo, 8 pages.

(Continued)

*Primary Examiner* — John Fitzgerald
*Assistant Examiner* — Tania Courson
(74) *Attorney, Agent, or Firm* — Haverstock & Owens, A Law Corporation

(57) ABSTRACT

Recent progress related to energy harvesting solutions and printed electronics is opening the opportunity for a smart label to combine chemical/physical color change technology with an electronic based reader architecture, which can be achieved with printed electronics technologies and can be suitable for monitoring applications that are very cost sensitive. The smart label provides an innovative product architecture to achieve a very low cost solution to monitor packaged items during storage and shipment. Exemplary applications of the smart label include, but are not limited to, cold chain monitoring, food monitoring, and in-package control of sensitive devices, such as electronic components.

21 Claims, 3 Drawing Sheets

(56) References Cited

U.S. PATENT DOCUMENTS

| | | | |
|---|---|---|---|
| 10,467,444 B2* | 11/2019 | Burchell | G01K 1/024 |
| 10,915,713 B2* | 2/2021 | Allen | G06F 3/04162 |
| 11,328,380 B2* | 5/2022 | Pinter | G06T 7/0006 |
| 2004/0000425 A1 | 1/2004 | White | |
| 2006/0131158 A1 | 6/2006 | Takiguchi | |
| 2006/0131440 A1 | 6/2006 | Yen | |
| 2006/0132427 A1 | 6/2006 | Weisberg | |
| 2007/0077682 A1 | 4/2007 | Cerio | |
| 2007/0203650 A1* | 8/2007 | Jensen | G01K 1/024 |
| | | | 374/E1.004 |
| 2007/0221404 A1 | 9/2007 | Das | |
| 2008/0054443 A1 | 3/2008 | Shih | |
| 2008/0139953 A1 | 6/2008 | Baker | |
| 2008/0288026 A1 | 11/2008 | Cross | |
| 2009/0083975 A1 | 4/2009 | Lee | |
| 2009/0301606 A1 | 12/2009 | Ueshima | |
| 2010/0000762 A1 | 1/2010 | Yang | |
| 2010/0160762 A1 | 1/2010 | McLaughlin | |
| 2010/0063365 A1 | 3/2010 | Pisani | |
| 2010/0107770 A1 | 5/2010 | Serban | |
| 2010/0185076 A1 | 7/2010 | Jeong | |
| 2011/0225816 A1 | 9/2011 | Chou | |
| 2011/0290540 A1 | 12/2011 | Jung | |
| 2013/0019383 A1 | 1/2013 | Korkala | |
| 2013/0060115 A1 | 3/2013 | Gehman | |
| 2013/0074331 A1 | 3/2013 | Brun | |
| 2013/0209672 A1 | 8/2013 | Reinmuth | |
| 2014/0013865 A1* | 1/2014 | White | G01L 1/205 |
| | | | 29/25.35 |
| 2014/0015633 A1 | 1/2014 | Nakae | |
| 2014/0343390 A1 | 11/2014 | Berzowska | |
| 2015/0148646 A1 | 5/2015 | Park | |
| 2015/0201856 A1 | 7/2015 | Stork | |
| 2015/0366504 A1 | 12/2015 | Connor | |
| 2016/0013152 A1 | 1/2016 | Yu et al. | |
| 2016/0153843 A1* | 6/2016 | Edson | G01K 11/12 |
| | | | 116/216 |
| 2016/0161376 A1 | 6/2016 | Myry | |
| 2016/0361015 A1 | 12/2016 | Wang | |
| 2017/0172421 A1 | 6/2017 | Dabby | |
| 2018/0106759 A1* | 4/2018 | de Oliveira Botelho | |
| | | | G01N 21/27 |
| 2018/0180574 A1 | 6/2018 | Paul | |
| 2018/0249767 A1 | 9/2018 | Begrische | |

OTHER PUBLICATIONS

Final Office Action, U.S. Appl. No. 15/069,757; filing date:; Mar. 14, 2016; applicant: Weifeng Liu; 16 pages.

Understanding the Influence of Copper Nanoparticles on Thermal Characteristics and Microstructural Dvelopment of a Tin-Silver Soldier, D.C. Lin, T.S. Srivatsan, G-X Wang, and R. Kovacevic (Submitted Jan. 12 ,20006, in revised form Oct. 10, 2006).

A Reliability Study of Nanoparticles Reinforced Composite Lead-Free Solder, Si Chen1m Lill Zhang1, Johan Liu1 (received Dec. 7, 2009; Accepted May 19, 2010, Published Sep. 25, 2.

Recent Development of Nano-solder Paste for Electronics Interconnect Applications; Johan Liu, Christina Andersson, Yuali Gao and Qijie Zhai, 2008 10th Electronics Packaging Technology Conference.

Non-Final Office Action, dated Oct. 29, 2020, U.S. Appl. No. 16/263,350, filing date: Jan. 31, 2019, applicant Marco De Angeli, 30 pages.

* cited by examiner

BATTERYLESS ARCHITECTURE FOR COLOR DETECTION IN SMART LABELS

FIELD OF THE INVENTION

The present invention is generally directed to sensing circuits. More specifically, the present invention is directed to a batteryless architecture for color detection in smart labels.

BACKGROUND OF THE INVENTION

To fulfill the need of a very low cost method to monitor temperature, humidity or other physical/chemical conditions or characteristics of packaged goods and components during storage or transportation, conventional approaches rely on chemically active labels, based on a sensitive ink and a paper based holder. A typical example is a humidity indicator test card that is inserted into an ESD (electro-static discharge) bag used to insure that electronic components inside the bag have not been exposed to high humidity levels. Sensitive ink on the test card changes color if the humidity within the bag exceeds or exceeded a certain threshold. The test card is visually checked by personnel in the manufacturing line, who notes the indicator status of the test card into a log sheet.

FIG. 1 illustrates an exemplary prior art conventional humidity indicator test card. The test card includes a support substrate 2, such as a paper based substrate, and two separate test areas 4 and 6. Each test area includes one or more areas where sensitive ink is applied. The sensitive ink may be applied directly to the support substrate 2 or to an intermediate substrate on the support substrate 2. For example, in test area 4, sensitive ink 8 is applied as a circular region shown in FIG. 1. The sensitive ink in this example is chemically active when exposed to humidity. The sensitive ink applied in each test area is configured for a specific threshold level. If the sensitive ink is exposed to the threshold level of humidity, the chemical activity is sufficient to change a color of the sensitive ink. In a typical application, an initial color of the sensitive ink is blue, but the sensitive ink changes color to pink when exposed to the threshold level of humidity. In the exemplary application of FIG. 1, test area 4 is designed with a sensitive ink 8 that has a threshold level of 60% humidity, as indicated by the threshold level indicator 14. In use, the test card is placed in an area for which the humidity level is to be monitored, such as the interior of an ESD bag. The test card needs to be checked and the status decided by a human being by visual observation. If the sensitive ink has not been exposed to humidity of 60% or higher, then the color of the sensitive ink 8 will be blue, its initial color. If the sensitive ink 8 is ever exposed to a humidity level of 60% or greater, the color of the sensitive ink will be pink, having changed from its initial color of blue. Each test area may also include application specific instructions related to the status (color) of the sensitive ink. For example, test area 4 is intended to be applied to level 2 parts (electronic components), and instructions 20 specify that if the sensitive ink 8 is not blue in color (initial color), then the part is to be baked so as to remove moisture that may have been absorbed by the part. Test cards may also include test areas with multiple different sensitive inks having different threshold levels, which provides finer indications of the exposed humidity levels. Test area 6 includes two separate sensitive ink samples, sensitive ink 10 and sensitive ink 12. The sensitive ink 10 has a threshold level of 10% humidity, as indicated by the threshold level indicator 16, and the sensitive ink 12 has a threshold level of 5% humidity, as indicated by the threshold level indicator 18. Instructions 22 for test area 6 indicate that test area 6 is to be used for level 2A-5A parts (electronic components), and that if the sensitive ink 10 is not blue in color and sensitive ink 18 is pink in color, then the part is to be baked so as to remove moisture that may have been absorbed by the part. The combination of test areas 4 and 6 provides three separate threshold levels of humidity, as indicated by the different sensitive inks 8, 10, 12, which indicates if the test card has been exposed to humidity levels of 60% or above, 10% or above, and 5% and above, respectively. Test cards may also include general instructions for interpreting the statuses of the sensitive inks, such as instructions 24. In general, test cards can be made with different numbers of test areas and sensitive inks, with different threshold levels, and with different inks that are sensitive to other characteristics than humidity.

Even with industrialization and automation progress, checking of this type of test card is still based on human reading, interpretation, and data filing. There is a trend in replacing this check with an electronic system, which is today based on a microcontroller, a sensor, a memory and a battery. This solution is very expensive and applicable only to monitor high cost parts.

SUMMARY OF THE INVENTION

Recent progress related to energy harvesting solutions and printed electronics is opening the opportunity for a smart label to combine chemical/physical color change technology with an electronic based reader architecture, which can be achieved with printed electronics technologies and can be suitable for monitoring applications that are very cost sensitive. The smart label provides an innovative product architecture to achieve a very low cost solution to monitor packaged items during storage and shipment. Exemplary applications of the smart label include, but are not limited to, cold chain monitoring, food monitoring, and in-package control of sensitive devices, such as electronic components.

In an aspect a smart label is disclosed. The smart label includes a light emitter, a substrate, and a photodetector. The substrate has a sensitive area that changes state according to exposure to a threshold level of an environmental characteristic. When the sensitive area is in an initial state the sensitive area has a first optical filtering property, and when the sensitive area is in a changed state the sensitive area has a second optical filtering property different than the first optical filtering property. The photodetector is aligned with the light emitter and the substrate, and the sensitive area of the substrate is positioned between the light emitter and the photodetector. The photodetector senses light emitted from the light emitter that passes through the sensitive area of the substrate and outputs a current proportional to a light intensity level of the sensed light, wherein the state of the sensitive area is determined according to an amount of current output from the photodetector. In some embodiments, the light emitter comprises an organic light emitting diode. In some embodiments, the environmental characteristic is a physical or chemical characteristic. In some embodiments, the environmental characteristic is a humidity level. In some embodiments, the sensitive area of the substrate comprises a sensitive ink applied to the substrate, further wherein the sensitive ink changes color when exposure to the environmental characteristic equals or exceeds the threshold value. In some embodiments, the first optical filtering property enables a first amount of light to pass through the substrate and the sensitive ink at the sensitive area, and the second optical filtering property enables a second amount of light to pass through the substrate and the sensitive ink at the sensitive area, the first amount is different than the second amount. In some embodiments, the smart label further comprises a wireless transmission circuit coupled to the photodetector, wherein the wireless transmission circuit is configured to convert the current output from the photodetector to a data signal indicative of the amount of current, and to wirelessly transmit the data signal. In some embodiments, the wireless transmission circuit comprises a near field communication circuit. In some embodiments, the smart label of further comprises an energy harvesting circuit coupled to the light emitter, wherein the energy harvesting circuit is configured to wirelessly harvest energy from an external source, and to output a corresponding supply voltage to power the light emitter. In some embodiments, the energy harvesting circuit comprises a near field communication energy harvesting circuit. In some embodiments, the near field communication energy harvesting circuit further comprises an analog-to-digital converter to convert the current output from the photodetector to a data signal indicative of the amount of current, wherein the near field communication energy harvesting circuit is further configured to wirelessly transmit the data signal.

In another aspect, another smart label is disclosed. The smart label includes a light emitter, a substrate, a first photodetector, and a second photodetector. The substrate has a reference area and a sensitive area. The sensitive area changes state according to exposure to a threshold level of an environmental characteristic. When the sensitive area is in an initial state the sensitive area has a first optical filtering property, and when the sensitive area is in a changed state the sensitive area has a second optical filtering property different than the first optical filtering property. The reference area has a fixed optical filtering. The first photodetector is aligned with the light emitter and the substrate, and the sensitive area of the substrate is positioned between the light emitter and the first photodetector. The first photodetector senses light emitted from the light emitter that passes through the sensitive area of the substrate and outputs a first current proportional to a light intensity level of the light that passes through the sensitive area. The second photodetector is aligned with the light emitter and the substrate, and the reference area of the substrate is positioned between the light emitter and the second photodetector. The second photodetector senses light emitted from the light emitter that passes through the reference area of the substrate and outputs a second current proportional to a light intensity level of the light that passes through the reference area. The state of the sensitive area is determined according to a ratio of an amount of current output from the first photodetector and an amount of current output from the second photodetector. In some embodiments, the light emitter comprises an organic light emitting diode. In some embodiments, the environmental characteristic is a physical or chemical characteristic. In some embodiments, the environmental characteristic is a humidity level. In some embodiments, the sensitive area of the substrate comprises a sensitive ink applied to the substrate, further wherein the sensitive ink changes color when exposure to the environmental characteristic equals or exceeds the threshold value. In some embodiments, the first optical filtering property enables a first amount of light to pass through the substrate and the sensitive ink at the sensitive area, and the second optical filtering property enables a second amount of light to pass through the substrate and the sensitive ink at the sensitive area, the first amount is different than the second amount. In some embodiments, the smart label further comprises a wireless transmission circuit coupled to the first photodetector and to the second photodetector, wherein the wireless transmission circuit is configured to convert the first current output from the first photodetector to a first data signal indicative of the amount of the first current, and to wirelessly transmit the first data signal, and the wireless transmission circuit is further configured to convert the second current output from the second photodetector to a second data signal indicative of the amount of the second current, and to wirelessly transmit the second data signal. In some embodiments, the wireless transmission circuit comprises a near field communication circuit. In some embodiments, the smart label further comprises an energy harvesting circuit coupled to the light emitter, wherein the energy harvesting circuit is configured to wirelessly harvest energy from an external source, and to output a corresponding supply voltage to power the light emitter. In some embodiments, the energy harvesting circuit comprises a near field communication energy harvesting circuit.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Figure 1:
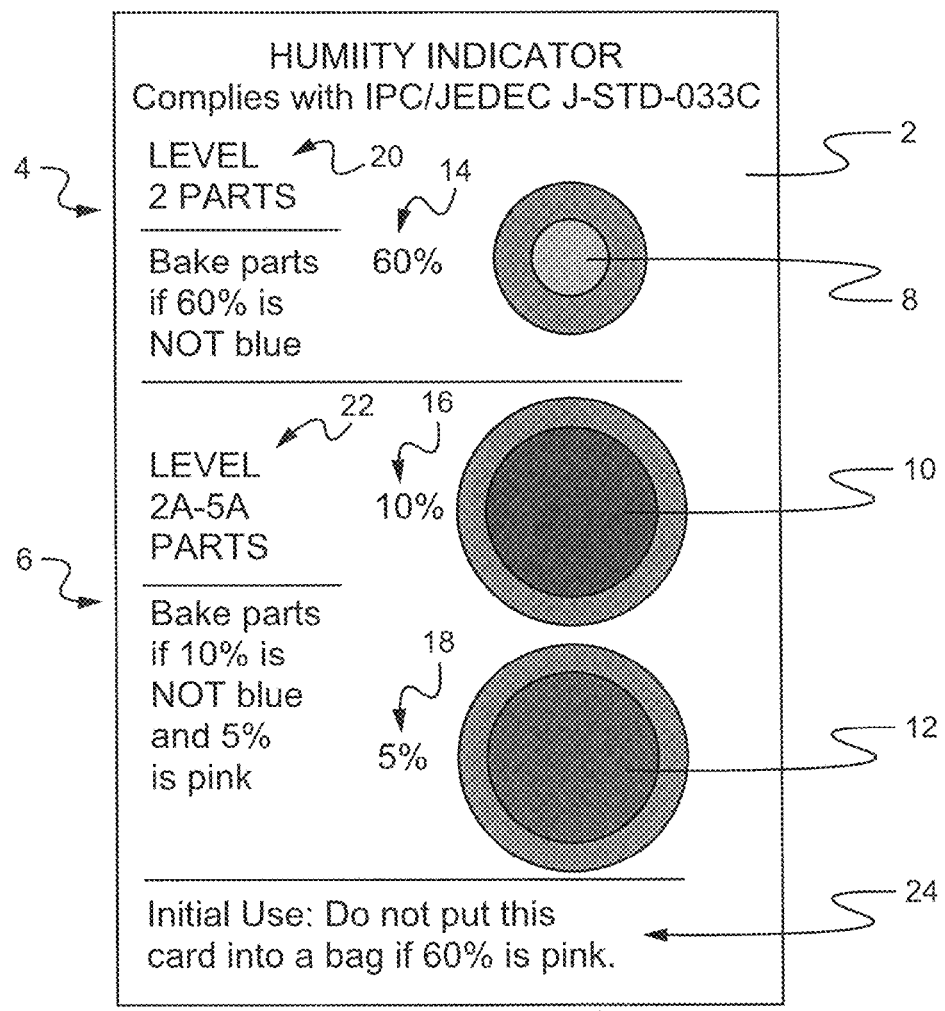
FIG. 1 illustrates an exemplary conventional humidity indicator test card.

Embodiments of the present application are directed to a smart label. Those of ordinary skill in the art will realize that the following detailed description of the smart label is illustrative only and is not intended to be in any way limiting. Other embodiments of the smart label will readily suggest themselves to such skilled persons having the benefit of this disclosure.

Reference will now be made in detail to implementations of the smart label as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Embodiments are directed to a smart label that includes a light emitter, a substrate having a sensitive area that changes state according to exposure to a threshold level of an environmental characteristic, and a photodetector. The substrate and sensing area are collectively referred to as a sensing label. The photodetector is aligned with the light emitter and the substrate. The sensitive area of the substrate is positioned between the light emitter and the photodetector. The sensitive area includes sensitive chemistry that changes state, for example changes color, when exposed to the threshold level. When the sensitive chemistry is in an initial state the sensitive area has a first optical filtering property, and when the sensitive chemistry is in a changed state the sensitive area has a second optical filtering property different than the first optical filtering property. In some embodiments, the first and second optical filtering properties dictate an amount of light that can pass through the substrate at the sensitive area. In some embodiments, the sensitive chemistry is a sensitive ink applied to the substrate. Subsequent description is directed to a sensitive ink, but it is understood that such discussion also applies to other types of sensitive chemistries. Examples of such sensitive chemistries include, but are not limited to, temperature activated inks, thermochromic inks, and organic dyes. In some embodiments, the sensitive area including the sensitive ink and substrate is configured to allow, or filter, some, but not all, of the light emitted from the light emitter to pass through. The photodetector is aligned to sense the light that passes through the sensitive area and to output a current proportional to a light intensity level of the sensed light. The state of the sensitive ink dictates an amount of light that passes through the sensitive area. The state of the sensitive ink is determined according to an amount of current output from the photodetector.

In some embodiments, the environmental characteristic to be monitored is a humidity level, and as such, the smart label is configured to indicate and determine a humidity level. It is understood that other characteristics can be monitored. Exemplary characteristics that can be monitored using chemistries that change color include, but are not limited to, a temperature above a certain threshold (permanent change or not) with thermochromic inks, cold chain integrity, a higher level of CO2, a presence of water wetting a substrate, a pH level of a solution, a presence of bacteria in a wound, an amount of time that is elapsed (can be used on food freshness smart labels), and a presence of oxygen (tamper detection). The smart label includes the sensing label, such as a color changing sensing label. The sensing label is made of the substrate and sensitive ink applied to one or both surfaces of the substrate. A sensitive ink is used that has an initial, unexposed state, such as the color blue, and a changed state, such as the color pink, where the sensitive ink changes state once a specific characteristic (environmental characteristic), such as humidity level, equals or exceeds a threshold value, such as 10% humidity. In some embodiments, the substrate is wettable, hydrophilic, and can be made of a made of paper cellulose, because the fibers can capture the reagent and keep it there. It is understood that other types of substrates can be used including, but not limited to other types of organic molecules on PET (polyethylene terephthalate).

Figure 2:
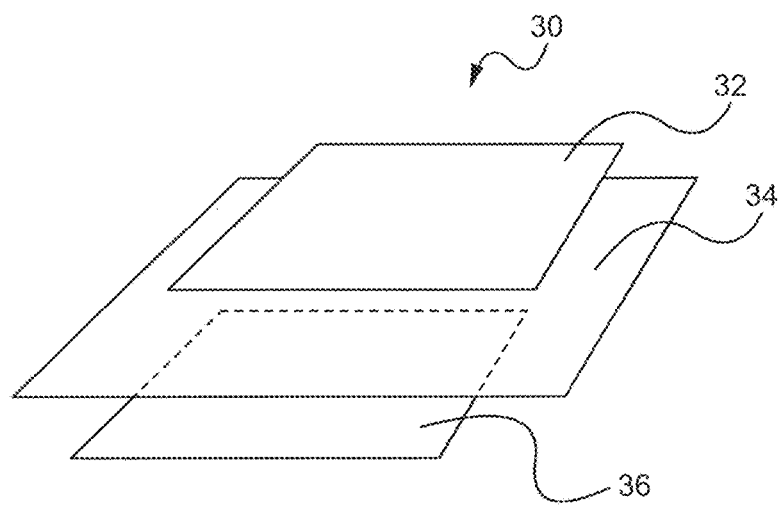
FIG. 2 illustrates a smart label according to some embodiments.

FIG. 2 illustrates a smart label according to some embodiments. The smart label 30 includes a photodetector 32, a sensing label 34, and a light emitter 36. The light emitter is positioned on one side of the sensing label 34, and the photodetector 32 is positioned on an opposite side of the sensing label 34. All or some of the sensing label 34 includes a sensitive area comprising a sensitive ink applied to one or both surfaces of an underlying substrate. The sensitive area can comprise an area equal to or greater than an area of the photodetector 32 and/or the light emitter 36. At least a portion of the sensitive area is aligned between the photodetector 32 and the light emitter 36. In some embodiments, a sensing area of the photodetector 32 is equal to or less than an area of the light emitter 36. The light emitter 36 emits light toward the sensing label 34, and the photodetector 32 measures a quantity of the emitted light that passes through the sensing label 34 and reaches the photodetector 32. In some embodiments, the light emitter 36 is an OLED (organic light-emitting diode). An OLED provides a uniform light distribution, or illumination, without any additional optics. Alternative light sources can be used along with optics for providing a uniform light illumination onto the correspondingly aligned sensing label 34. The amount of emitted light that passes through the sensing label 34, and therefore the quantity of emitted light detected by the photodetector 32, varies according to the state of the sensitive ink. The quantity of light sensed by the photodetector is ultimately measured as a corresponding voltage level by a connected measuring circuit (not shown). When the threshold level being measured is reached, such as a humidity level, the state of the sensitive ink changes, resulting in a change in the amount of emitted light that passes through the sensitive ink and a change in the quantity of light sensed by the photodetector 32, measured as a change in the voltage level. For example, when the sensitive ink is in its initial state (e.g. the color blue) a first amount (low) of emitted light passes through, whereas when the sensitive ink changes state (e.g. the color pink) due to exposure to the preconfigured threshold level, then a second amount (high) of emitted light passes through.

Figure 3:
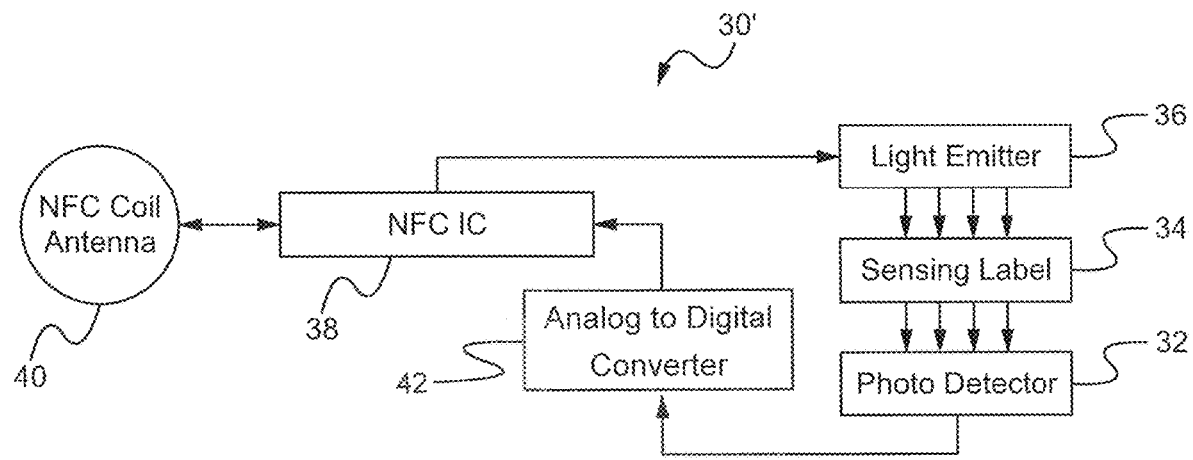
FIG. 3 illustrates a schematic diagram of the smart label of FIG. 2 further configured with a NFC circuit according to some embodiments.

The photodetector 32 converts light photons into current, which is output from the photodetector 32 as sensed current. The greater the amount of light photons sensed by the photodetector, the greater the current. The current output from the photodetector 32 can be read to determine a light intensity value of the emitted light that is sensed by the photodetector 32. In some embodiments, the smart label also includes processing circuitry and networking circuitry. The processing circuitry is configured to convert the current received from the photodetector 32 to a transmittable data signal indicative of an amount of the received current. In some embodiments, the processing circuitry includes an analog-to-digital converter 42 for converting the current output from the photodetector 32 to the transmittable data signal. The networking circuitry is configured to transmit the data signal. In some embodiments, the networking circuitry is a wireless transmission circuit. In some embodiments, the smart label also includes an energy harvesting circuit coupled to the light emitter and the photodetector. The energy harvesting circuit is configured to harvest energy from an external source, and to output a corresponding supply voltage to power the light emitter and activate the photodetector. In some embodiments, the energy harvesting circuit is a wireless energy harvesting circuit. In some embodiments, the wireless energy harvesting circuit is a near field communication (NFC) energy harvesting circuit. In some embodiments, both the wireless transmission circuit and the energy harvesting circuit are implemented as a near field communication (NFC) circuit that functions as a NFC wireless communication circuit and a NFC energy harvesting circuit. FIG. 3 illustrates a schematic diagram of the smart label of FIG. 2 further configured with a NFC circuit according to some embodiments. The smart label 30' in FIG. 3 includes the same, or similar, photodetector 32, sensing label 34, and light emitter 36 as the smart label 30 in FIG. 2. The smart label 30' also includes processing, networking, and energy harvesting circuitry implemented as NFC IC 38 and NFC coil antenna 40. It is understood that alternative processing, networking, and energy harvesting circuitry can be used and/or alternative structural integration of the various circuits can also be implemented. The NFC IC 38 is connected to the light emitter 36 and the photodetector 32. The NFC coil antenna 40 and NFC IC 38 harvests energy from a reader, or other appropriate electronic device, when the reader is proximately positioned to the NFC coil antenna 40. The light emitter 36 is powered by energy harvested by the NFC harvesting circuit. The current output from the photodetector 32 is received by the NFC IC 38, which outputs a digital signal proportional to the input current. The digital signal is transmitted via an antenna, such as the NFC coil antenna 40, to a measuring circuit, such as included in a reader. The reader receives the transmitted digital signals and converts the digital signals to corresponding voltage quantities, which are compared to known voltage values for each of the states of the sensitive ink on the sensing label 34. The NFC harvesting circuit implemented by the NFC coil antenna 40 and the NFC IC 38 enables sufficient energy collection to power the NFC IC 38, the light emitter 36, and the photodetector 32. In some embodiments, the smart label 30' is implemented as a single functional flexible circuit board.

Figure 4:
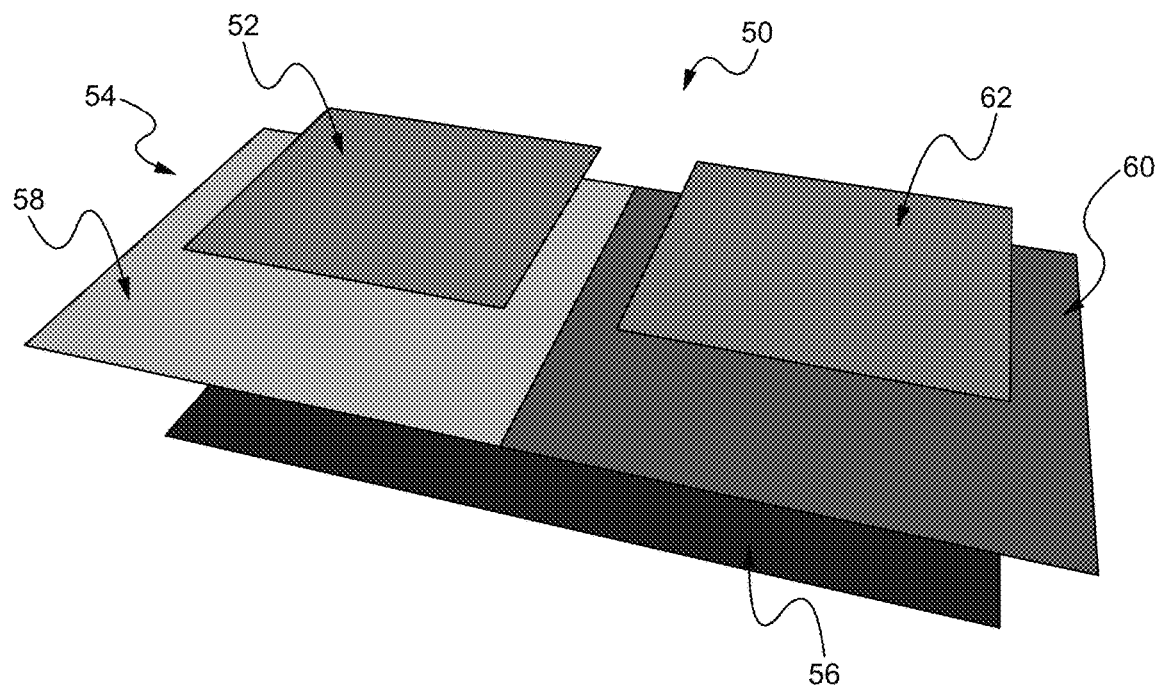
FIG. 4 illustrates a smart label having a dual channel configuration according to some embodiments.

The single photodetector configuration, as described above, is referred to as a single channel configuration. Additional channels can also be used. FIG. 4 illustrates a smart label having a dual channel configuration according to some embodiments. The smart label 50 includes a photodetector 52, a photodetector 62, a sensing label 54, and a light emitter 56. The sensing label includes two separate areas, a sensitive area 58 and a reference area 60. The light emitter 36 is positioned on one side of the sensing label 54, and the photodetectors 52, 62 are positioned on an opposite side of the sensing label 54. All or some of the sensitive area 58 comprises a sensitive ink applied to one or both surfaces of an underlying substrate. The sensitive area 58 can comprise an area equal to or greater than an area of the photodetector 52 and/or the light emitter 56. The photodetector 52, the sensitive area 58 of the sensing label 54, and the light emitter 56 function similarly as the photodetector 32, the sensing label 34, and the light emitter 36 of FIG. 2. The photodetector 62, the reference area 60 of the sensing label 54, and the light emitter 56 also function similarly as the photodetector 32, the sensing label 34, and the light emitter 36 of FIG. 2, except that the reference area 60 does not change state once exposed to the threshold level of the specific characteristic (environmental characteristic) to be monitored In the exemplary configuration shown in FIG. 4, a single light emitter 56 is used to illuminate both the sensitive area 58 and the reference area 60. The light emitter 56 is configured to emit a same amount of light onto each the sensitive area 58 and the reference area 60. Alternatively, separate light emitters can be used, one for illuminating the sensitive area 58 and another for illuminating the reference area 60. In this case the two light emitters are configured to emit a same amount of light onto the sensitive area 58 and the reference area 60. In some embodiments, the light emitter 56 is an OLED. At least a portion of the sensitive area 58 is aligned between the photodetector 52 and the light emitter 56. The light emitter 56 emits light toward the sensing label 54. The photodetector 52 senses a quantity of the emitted light that passes through the sensing label 54 at the sensitive area 58 and reaches the photodetector 52. The photodetector 62 senses a quantity of the emitted light that passes through the sensing label 54 at the reference area 60 and reaches the photodetector 62.

Each photodetector in a multiple channel configuration, such as the dual channel configuration of FIG. 4, is configured to measure a quantity of emitted light that passes through a select area of the sensing label. In an exemplary configuration, such as that in FIG. 4, one channel can be configured as the sensitive area, also referred to as an active area, and a second channel can be configured as the reference area, also referred to as a static or non-active area. The sensitive area corresponds to an area where sensitive ink starts in its initial state and changes state when exposed to a threshold level of a monitored characteristic. In another exemplary configuration, one channel can be configured as a first active area having a first threshold level at which its state changes, and a second channel can be configured as a second active area having second threshold level at which its state changes, where the first threshold level is different than the second threshold level. In this configuration, each of the first active area and the second area start in its initial state. In general, each monitored area, for example each active area and each reference area, can be considered a pixel for which a light intensity of each is sensed by the corresponding photodetectors.

In the exemplary configuration shown in FIG. 4, the sensitive area 58 is an active region that includes sensitive ink that changes state when exposed to a threshold level of the desired characteristic to be monitored, such as humidity, and the reference area 60 is a non-active, reference area. In some embodiments, the reference area 60 is configured with sensitive ink that is already exposed, and is therefore in the changed state, such as exposed sensitive ink of the color pink. In other embodiments, the reference area 60 is configured using other ink, substrate, or combination of materials that mimics the light transparency characteristics (optical filtering property) of the substrate/sensitive ink combination corresponding to the changed state of the sensitive ink in the sensitive area 58. In still other embodiments, the reference area 60 is configured using any material combination that enables some percentage of emitted light to be passed through to the second photodetector 62, this amount of passed through light, as sensed by the photodetector 62, is used as a baseline for comparison to the amount of light passing through the sensitive area 58. In general, a purpose of the reference channel is to measure a variability of the brightness of the light emitter 56, and provide a means for compensating for such variability. In either configuration, the reference area 60 functions as a reference to which the emitted light passing through the sensitive area 58 (active area) and sensed by the first photodetector 52 can be compared. For example, in the exemplary configuration shown in FIG. 4, the sensitive area 58 includes sensitive ink that has an initial state corresponding to the color blue, and a changed state corresponding to the color pink. As previously described, the amount of emitted light that passes through the sensitive area 58 when the sensitive ink is colored blue is different than the amount of emitted light that passes through the sensitive area 58 when the sensitive ink is colored pink. The reference area 60 is prepared to enable a same amount of light to pass through as the amount of light that passes through the sensitive area 58 when the sensitive ink is exposed to the threshold level of the monitored characteristic, in other words when the sensitive ink is in its changed state. In the same exemplary configuration shown in FIG. 4, the reference area 60 includes a same substrate and sensitive ink used in the sensitive area 58, but the sensitive ink in the reference area 60 already has been exposed to the threshold level of the monitored characteristic, which in this case means the sensitive ink in the reference area 60 is the color pink. Use of a reference area is particularly useful because an illumination of the light emitter varies according to a magnitude of the field strength to which the NFC energy harvesting circuit is exposed. As such, the absolute values of the light intensity measured by the photodetectors may vary from reading to reading based on the field strength present at each reading. Use of the reference area enables the use of a ratio between the sensed light intensity values of the reference and active areas, which eliminates the impact of varying field strength when taking the measurements.

In some embodiments, the multiple channel smart label also includes processing circuitry, networking circuitry, and/or energy harvesting circuitry of the same, or similar, types as those circuits in FIG. 3. In some embodiments, the energy harvested by a single NFC circuit (NFC coil and NFC IC) is sufficient to activate the photodetector and to power the light emitter and NFC circuit. In other embodiments, the NFC circuit is scaled to harvest a greater amount of energy. For example, a second NFC coil and a second NFC IC can be added and coupled in series to a first NFC coil and first NFC IC to double the amount of power harvested and supplied to the smart label components. The greater amount of harvested energy can be used to power a multiple channel configuration. A multiple channel configuration may include multiple photodetectors and multiple NFC circuits, each of which requires harvested energy to operate. In some embodiments, the multiple channel configuration also includes a larger light emitter than in a single channel configuration so as to illuminate multiple separate areas on the sensing label aligned with the multiple photodetectors. Alternatively, the multiple channel configuration can include multiple light emitters to illuminate the multiple separate areas on the sensing label. In either case, a greater amount of power may be required than in a single channel configuration in order to operate the larger light emitter or the multiple light emitters.

Figure 5:
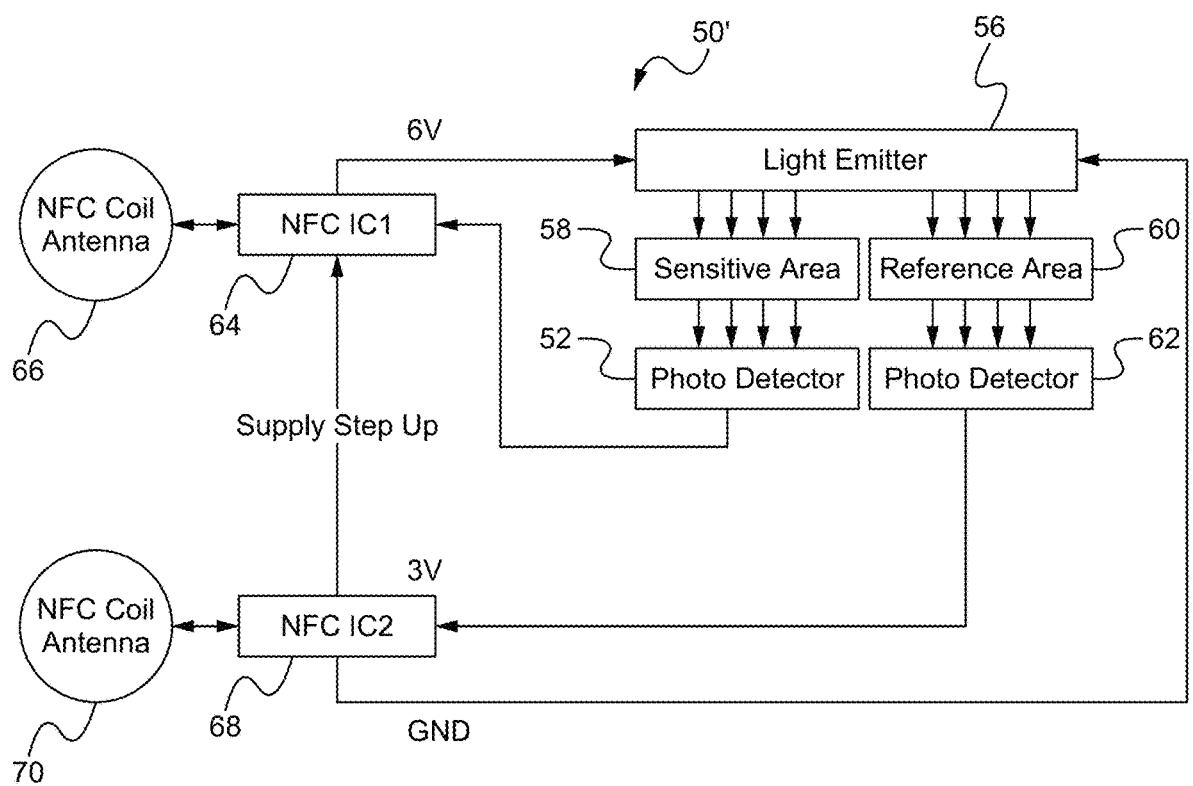
FIG. 5 illustrates a schematic diagram of the smart label of FIG. 4 further configured with multiple NFC circuits according to some embodiments.

FIG. 5 illustrates a schematic diagram of the smart label of FIG. 4 further configured with multiple NFC circuits according to some embodiments. The smart label 50' in FIG. 5 includes the same, or similar, photodetector 52, photodetector 62, sensing label 54, and light emitter 56 as the smart label 50 in FIG. 4. The smart label 50' also includes processing, networking, and energy harvesting circuitry implemented as NFC IC 64 and NFC coil antenna 66 and NFC IC 68 and NFC coil antenna 70. It is understood that alternative processing, networking, and energy harvesting circuitry can be used and/or alternative structural integration of the various circuits can also be implemented. In some embodiments, the smart label 50' is implemented as a single functional flexible circuit board.

The NFC IC 64 is connected to the light emitter 56 and the photodetector 52. The NFC IC 68 is connected to the light emitter 56 and the photodetector 62. The NFC IC 68 is connected to the NFC IC 64 such that both NFC energy harvesting circuits are connected in series. The NFC coil antenna 66 and NFC IC 64, and the NFC coil antenna 70 and NFC IC 68 harvest energy from a reader, or other appropriate electronic device, when the reader is proximately positioned to the NFC coil antenna 66 and the NFC coil antenna 70. The light emitter 56 is powered by energy harvested by both NFC energy harvesting circuits. The current output from the photodetector 52 is received by the NFC IC 64, which outputs a digital signal proportional to the input current. The digital signal is transmitted via an antenna, such as the NFC coil antenna 66, to a measuring circuit, such as included in a reader. Similarly, the current output from the photodetector 62 is received by the NFC IC 68, which outputs a digital signal proportional to the input current. The digital signal is transmitted via an antenna, such as the NFC coil antenna 70, to the reader. The reader receives the transmitted digital signals and converts the digital signals to corresponding voltage quantities, which are processed to determine a state of the sensitive area 58. In general, the reader, or other appropriate electronic device, can determine the state of the sensitive area 58 by comparing these voltage values to each other (in the case of smart label 50' where a reference area is used) and/or to known and expected voltage values corresponding to each of the states, initial and changed, to automatically make a determination as to whether or not the active region(s) has been exposed to the threshold level of the monitored characteristic.

In the exemplary application shown in FIG. 5, the first NFC coil antenna 66 and the first NFC IC 64 harvest energy to supply 3 VDC, and the second NFC coil antenna 70 and the second NFC IC 68 harvest energy to supply another 3 VDC. The series connection of the two NFC energy harvesting circuits supplies a total of 6 VDC to the light emitter 56. Multiple NFC energy harvesting circuits also enable sufficient harvested energy to active the photodetectors 52, 62, process the current output from photodetectors 52, 62, and transmit corresponding data signals. In the exemplary configuration shown in FIG. 5, the first NFC coil antenna 66 and the first NFC IC 64 harvest sufficient energy to activate the first photodetector 52, process the sensed current supplied by the first photodetector 52, and to transmit corresponding data signals, and the second NFC coil antenna 70 and the second NFC IC 68 harvest sufficient energy to activate the photodetector 62, process the sensed current supplied by the second photodetector 62, and to transmit corresponding data signals. The data signals are separately received and processed by the proximately positioned reader or other appropriate electronic device.

In some embodiments, in a multi-channel configuration, multiple separate NFC circuits are used, for example the NFC coil antenna 66/NFC IC 64 and the NFC coil antenna 70/NFC IC 68, because each NFC circuit can only transmit a single signal, and in the case of multiple channels, multiple signals are to be transmitted. In other embodiments, a single NFC circuit is used as a dual-channel, or multi-channel, in which case there is no need for a one-to-one relationship between the number of channels of photo-detection and the number of NFC circuits.

As described above, the smart label can have a wireless configuration, and as such, the smart label can be activated and read without physically having to access the smart label. This is particularly useful in applications where the environment being monitored, such as IC components within an ESD bag, should remain sealed or isolated. For example, where the monitored environmental characteristic is the humidity level exposure of an IC component within an ESD bag, a reader can be positioned proximate the ESD bag, but still exterior to the ESD bag, and the smart label can be wirelessly accessed and read without having to open the ESD bag.

The present application has been described in terms of specific embodiments incorporating details to facilitate the understanding of the principles of construction and operation of the smart label. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A smart label comprising:
   a. a light emitter;
   b. a substrate having a sensitive area that changes state according to exposure to a threshold level of an environmental characteristic, wherein when the sensitive area is in an initial state the sensitive area has a first optical filtering property, and when the sensitive area is in a changed state the sensitive area has a second optical filtering property different than the first optical filtering property; and
   c. a photodetector aligned with the light emitter and the substrate, wherein the sensitive area of the substrate is positioned between the light emitter and the photodetector, further wherein the photodetector senses light emitted from the light emitter that passes through the sensitive area of the substrate and outputs a current proportional to a light intensity level of the sensed light, wherein the state of the sensitive area is determined according to an amount of current output from the photodetector.

2. The smart label of claim 1 wherein the light emitter comprises an organic light emitting diode.

3. The smart label of claim 1 wherein the environmental characteristic is a physical or chemical characteristic.

4. The smart label of claim 1 wherein the environmental characteristic is a humidity level.

5. The smart label of claim 1 wherein the sensitive area of the substrate comprises a sensitive ink applied to the substrate, further wherein the sensitive ink changes color when exposure to the environmental characteristic equals or exceeds the threshold value.

6. The smart label of claim 5 wherein the first optical filtering property enables a first amount of light to pass through the substrate and the sensitive ink at the sensitive area, and the second optical filtering property enables a second amount of light to pass through the substrate and the sensitive ink at the sensitive area, the first amount is different than the second amount.

7. The smart label of claim 1 further comprising a wireless transmission circuit coupled to the photodetector, wherein the wireless transmission circuit is configured to convert the current output from the photodetector to a data signal indicative of the amount of current, and to wirelessly transmit the data signal.

8. The smart label of claim 7 wherein the wireless transmission circuit comprises a near field communication circuit.

9. The smart label of claim 1 further comprising an energy harvesting circuit coupled to the light emitter, wherein the energy harvesting circuit is configured to wirelessly harvest energy from an external source, and to output a corresponding supply voltage to power the light emitter.

10. The smart label of claim 9 wherein the energy harvesting circuit comprises a near field communication energy harvesting circuit.

11. The smart label of claim 10 wherein the near field communication energy harvesting circuit further comprises an analog-to-digital converter to convert the current output from the photodetector to a data signal indicative of the amount of current, wherein the near field communication energy harvesting circuit is further configured to wirelessly transmit the data signal.

12. A smart label comprising:
   a. a light emitter;
   b. a substrate having a reference area and a sensitive area, the sensitive area changes state according to exposure to a threshold level of an environmental characteristic, wherein when the sensitive area is in an initial state the sensitive area has a first optical filtering property, and when the sensitive area is in a changed state the sensitive area has a second optical filtering property different than the first optical filtering property, further wherein the reference area has a fixed optical filtering property;
   c. a first photodetector aligned with the light emitter and the substrate, wherein the sensitive area of the substrate is positioned between the light emitter and the first photodetector, further wherein the first photodetector senses light emitted from the light emitter that passes through the sensitive area of the substrate and outputs a first current proportional to a light intensity level of the light that passes through the sensitive area; and
   d. a second photodetector aligned with the light emitter and the substrate, wherein the reference area of the substrate is positioned between the light emitter and the second photodetector, further wherein the second photodetector senses light emitted from the light emitter that passes through the reference area of the substrate and outputs a second current proportional to a light intensity level of the light that passes through the reference area, wherein the state of the sensitive area is determined according to a ratio of an amount of current output from the first photodetector and an amount of current output from the second photodetector.

13. The smart label of claim 12 wherein the light emitter comprises an organic light emitting diode.

14. The smart label of claim 12 wherein the environmental characteristic is a physical or chemical characteristic.

15. The smart label of claim 12 wherein the environmental characteristic is a humidity level.

16. The smart label of claim 12 wherein the sensitive area of the substrate comprises a sensitive ink applied to the substrate, further wherein the sensitive ink changes color when exposure to the environmental characteristic equals or exceeds the threshold value.

17. The smart label of claim 16 wherein the first optical filtering property enables a first amount of light to pass through the substrate and the sensitive ink at the sensitive area, and the second optical filtering property enables a second amount of light to pass through the substrate and the sensitive ink at the sensitive area, the first amount is different than the second amount.

18. The smart label of claim 12 further comprising a wireless transmission circuit coupled to the first photodetector and to the second photodetector, wherein the wireless transmission circuit is configured to convert the first current output from the first photodetector to a first data signal indicative of the amount of the first current, and to wirelessly transmit the first data signal, and the wireless transmission circuit is further configured to convert the second current output from the second photodetector to a second data signal indicative of the amount of the second current, and to wirelessly transmit the second data signal.

19. The smart label of claim 18 wherein the wireless transmission circuit comprises a near field communication circuit.

20. The smart label of claim 12 further comprising an energy harvesting circuit coupled to the light emitter, wherein the energy harvesting circuit is configured to wirelessly harvest energy from an external source, and to output a corresponding supply voltage to power the light emitter.

21. The smart label of claim 20 wherein the energy harvesting circuit comprises a near field communication energy harvesting circuit.

\* \* \* \* \*